July 19, 1955  R. A. BAILEY  2,713,494
CHILD'S VEHICLE FOR STROLLING OR WALKING
Filed Sept. 13, 1950  4 Sheets-Sheet 1
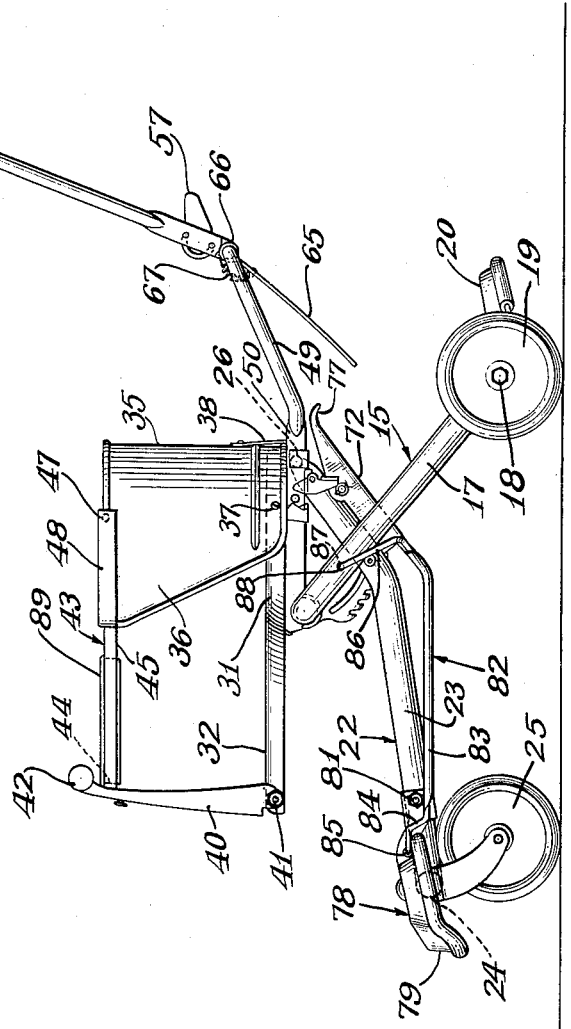
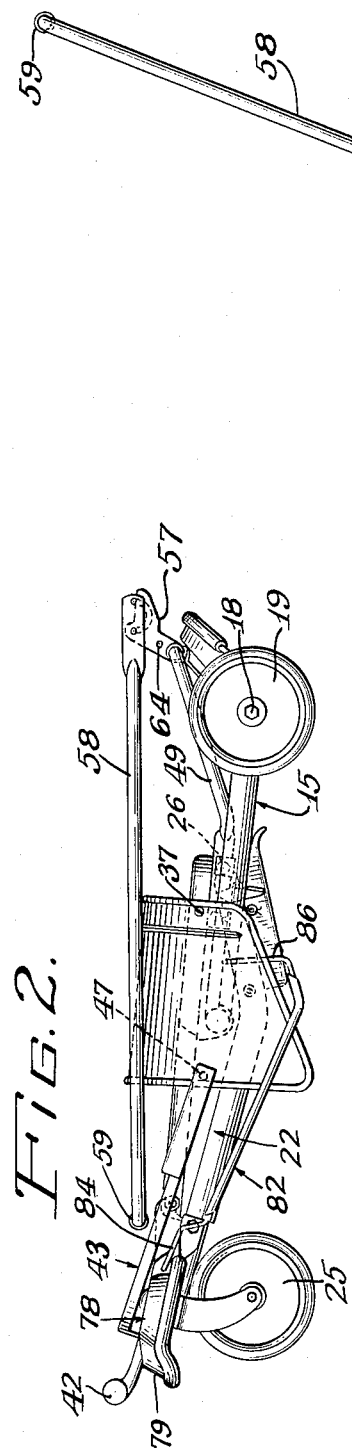
Inventor:
Robert A. Bailey
By Glenn S. Noble
Atty.

July 19, 1955            R. A. BAILEY            2,713,494
CHILD'S VEHICLE FOR STROLLING OR WALKING
Filed Sept. 13, 1950            4 Sheets-Sheet 2
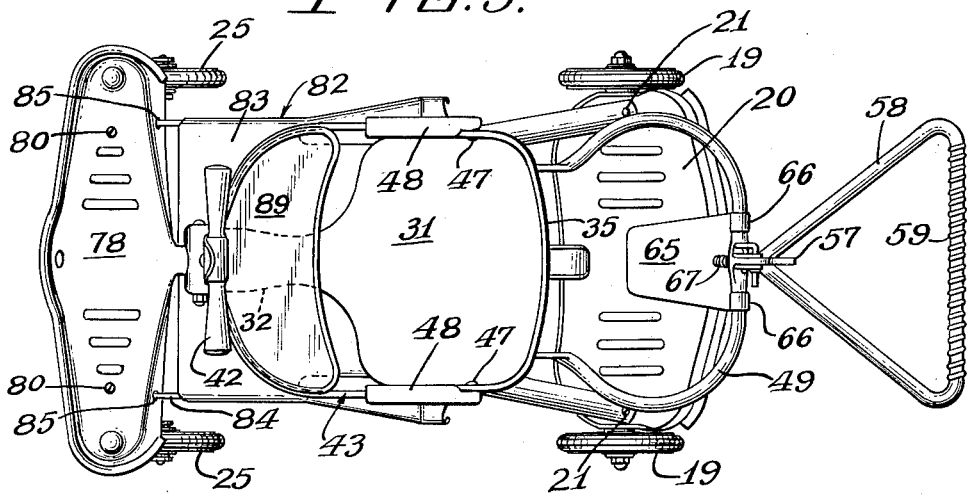
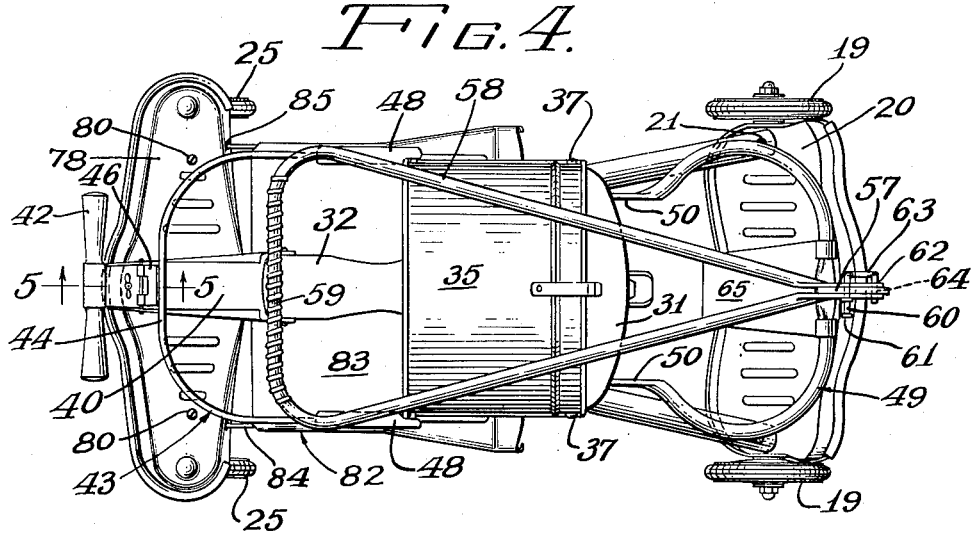
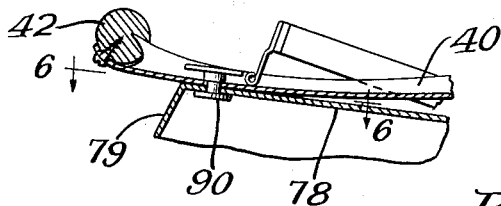
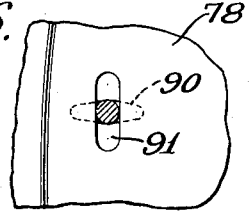
Inventor:
Robert A. Bailey
By Glenn S. Noble, Atty.

July 19, 1955   R. A. BAILEY   2,713,494
CHILD'S VEHICLE FOR STROLLING OR WALKING
Filed Sept. 13, 1950   4 Sheets-Sheet 3
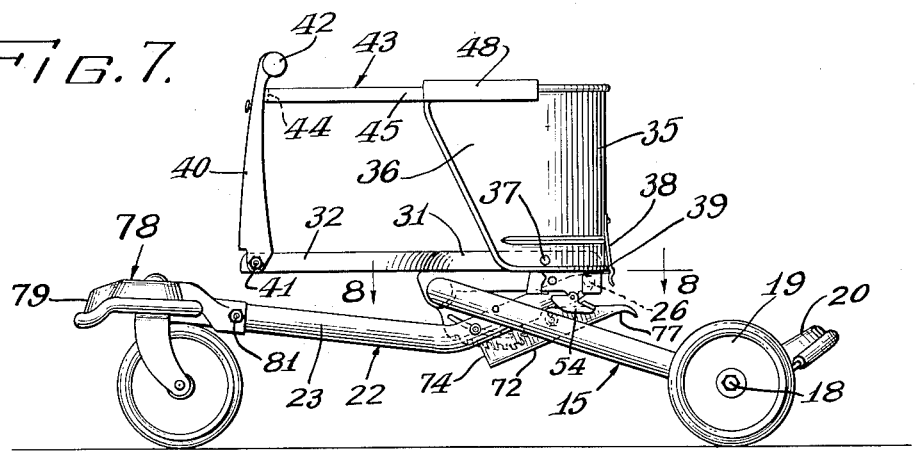
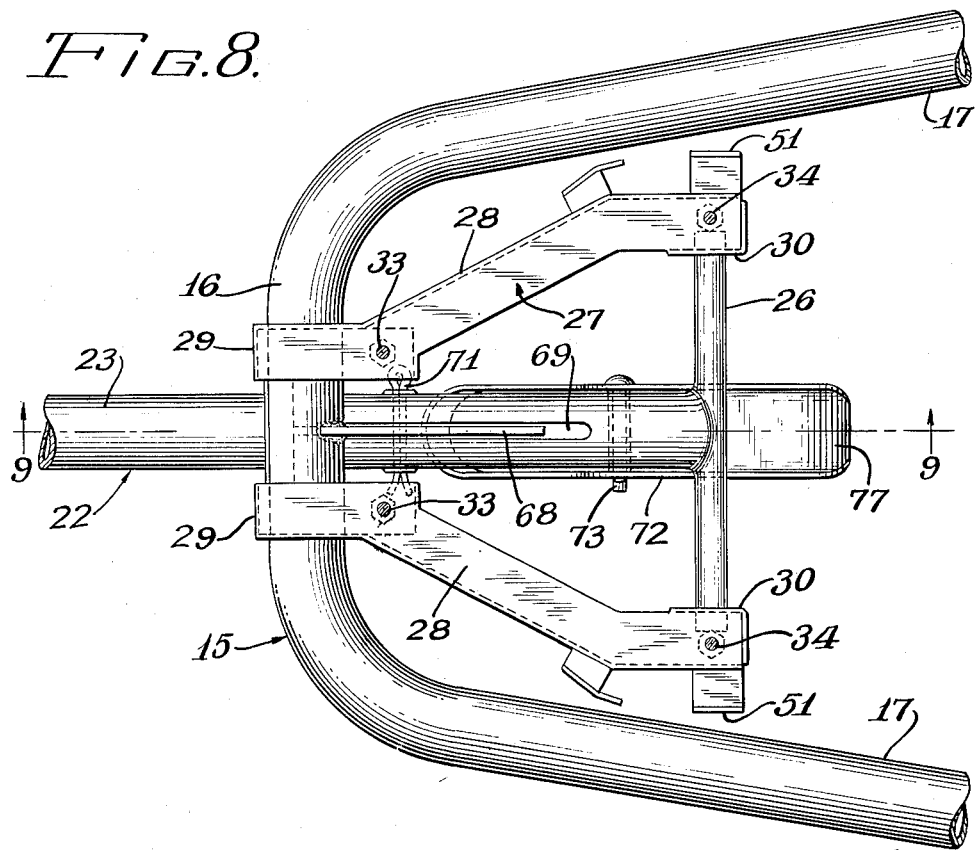
Inventor:
Robert A. Bailey
By Glenn S. Noble
Atty.

July 19, 1955  R. A. BAILEY  2,713,494
CHILD'S VEHICLE FOR STROLLING OR WALKING
Filed Sept. 13, 1950  4 Sheets-Sheet 4
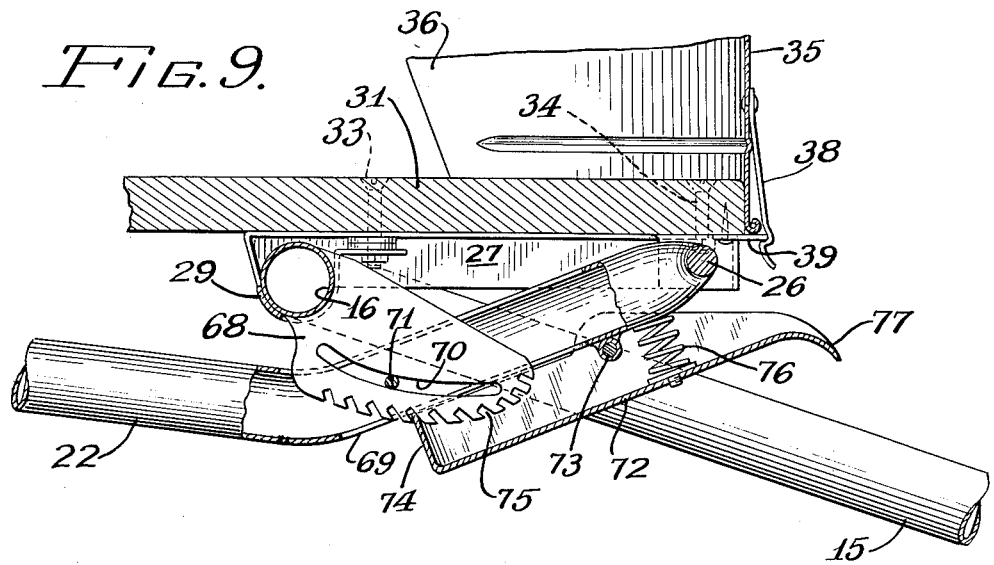
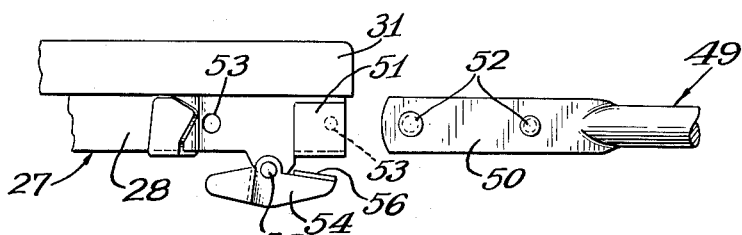
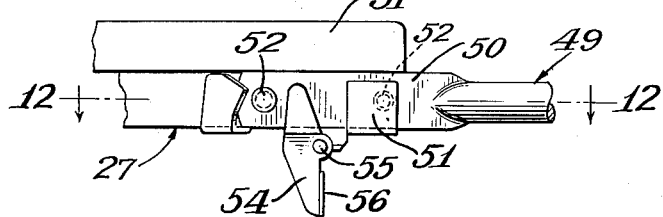
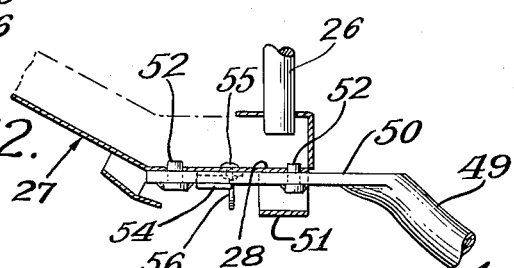
Inventor:
Robert A. Bailey
By Glenn S. Noble
Atty.

United States Patent Office 2,713,494
Patented July 19, 1955

2,713,494

CHILD'S VEHICLE FOR STROLLING OR WALKING

Robert A. Bailey, Burbank, Calif.

Application September 13, 1950, Serial No. 184,550

2 Claims. (Cl. 280—36)

This invention relates to small vehicles or buggies adapted to be used as strollers, walkers, creepers and for shopping.

The principal objects of the invention are to provide a vehicle of the character indicated which may be used in various ways and particularly for shopping purposes which will be of simple construction and readily adjustable for various positions and purposes. It is made so that it is readily foldable for carrying or for stowing away in restricted places.

Other objects and advantages will appear more fully from the following description taken in connection with the accompanying drawings in which, Fig. 1 is a side view;
Fig. 2 is a similar view showing the vehicle folded;
Fig. 3 is a top plan view of the vehicle as shown in Fig. 1;
Fig. 4 is a top plan view of the vehicle as shown in Fig. 2;
Fig. 5 is a sectional detail taken on the line 5—5 of Fig. 4;
Fig. 6 is a sectional view taken on the line 6—6 of Fig. 5;
Fig. 7 is a side view similar to Fig. 1 but with the handle and connections removed; Fig. 8 is an enlarged sectional view taken on the line 8—8 of Fig. 7; Fig. 9 is an enlarged sectional view taken on the line 9—9 of Fig. 8;

Figs. 10, 11 and 12 are details showing the arrangement for detaching the handle bracket.

My improved vehicle has a main substantially U-shaped frame member 15 with a top horizontal portion 16 and rearwardly and downwardly extending branches 17. An axle 18 extends through the branches 17 and is provided with wheels 19 of any suitable type. A substantially horizontal bent plate 20 is also secured to the branches 17 by means of bolts 21 as shown in Fig. 3. This plate serves for carrying bags, packages, or the like.

The vehicle also has another frame member 22 which is of substantially T-shape with its main branch 23 extending longitudinally at the center of the vehicle and a cross branch 24 extending across at the front of the vehicle. This branch is provided with caster wheels 25 which are pivotally mounted in the ends thereof. The main branch 22 also has a transverse rod 26 for supporting the vehicle body.

A body supporting bracket or frame 27 is formed of two diverging members 28 as shown in Fig. 8. The front ends of these members are provided with bearings 29 which rotatably engage with the branch 16 of the frame member 15. The rear ends of these members have brackets or bearings 30 which engage with the ends of the rod 26.

The vehicle body includes a seat 31 which forms the bottom thereof with a narrow extension 32 which extends between the legs of the child. This seat is secured to the bracket 27 by means of bolts 33 and 34 as shown particularly in Figs. 8 and 9. The body has a back 35, and sides 36 which are pivotally connected to the seat by means of screws or bolts 37. The back is held in vertical position by means of a spring catch 38 which engages with a lug or detent 39 at the back of the seat. An arm or post 40 is pivotally connected to the extension 32 by means of a bolt 41 and has a transverse handle 42 at the upper end. The post 40 is connected with the sides 36 by means of a U-shaped bail 43 having a transverse end portion 44 and rearwardly extending branches 45. The front portion 44 is hingedly connected to the upper end of the post 40 at 46 and the rear ends are pivoted at 47 to the sides 36. Handles 48 are mounted on the ends of the branches 45.

A handle supporting bracket 49 has two substantially parallel arms 50 which are adapted to be inserted in keepers 51 on the sides of the rear ends of the frame members 28 as shown in Figs. 10 to 12. These arms have rivets or pins 52 which detachably engage with holes 53 in the sides of the bracket, the arms being somewhat yielding and biased so that they tend to press inwardly to cause the pins to engage with such holes. The arms are held in fixed position by means of clamping levers 54 which are pivoted at 55 to the frame members and which are adapted to be moved into pressing engagement with the arms, by means of the thumb pieces 56. When the handle supporting bracket 49 is to be attached to the vehicle, the arms 50 are spread apart sufficiently to be inserted in position and the pins will enter the holes 53, thereupon the clamping levers 54 are moved to locking position as shown in Fig. 11.

The rear portion of the handle supporting bracket 49 has a substantially L-shaped plate or bracket 57 welded or otherwise secured thereto for attachment of the handle 58 which may be of any desired shape, but which is preferably triangular with an outer transverse handle hold 59. The handle is pivotally secured to the plate 57 by means of a pin 60 which is riveted at one end as shown at 61 to keep it in engagement with the handle and plate. The other end of the pin is connected to a shorter parallel pin 62 by a loop connection 63. The shorter pin is in constant engagement with a hole in one branch of the handle and is adapted to be projected through a hole 64 in the plate 57 when the handle is in extended position in order to rigidly connect the handle with the plate. When the handle is to be folded, the shorter pin is withdrawn from the hole in the plate which permits the handle to swing on its pivot.

A plate 65 is hinged at 66 to the rear portion of the supporting bracket 49 and normally extends downwardly and forwardly as shown in Fig. 1, being yieldingly held in such position by means of a spring 67. This plate serves to steady or hold packages or bags on the bed plate 20.

A plate or ratchet 68 is welded or otherwise affixed to the horizontal portion 16 of the frame member 15 and extends downwardly through a slot 69 in the frame member 22. It is provided with an arcuate slot 70 for receiving a pin 71 extending through the frame member 22 as shown in Figs. 8 and 9. A catch or pawl 72 is pivoted at 73 to the frame member 22 and its inner end 74 is adapted to engage with any one of a plurality of notches 75 in the peripheral edge of the plate 68. The pawl is held for normal engagement by means of a compression spring 76 which extends between it and the frame member. It is provided with a curved extension or thumb piece 77 for convenience in disengaging it from the teeth of the pawl. The height of the seat may be readily adjusted by releasing the pawl 72 and lifting up on the seat whereby the upper ends of the frame members 15 and 22 will swing upwardly to any desired position within the range of the teeth or notches in the ratchet 68. This provides for as many positions of the seat as desired by making the desired number of notches in the ratchet.

A housing 78 having a downwardly extending peripheral flange 79 fits over the cross branch 24 and is secured thereto by means of bolts 80. It is also secured to the frame member 23 by means of a bolt 81. A detachable foot rest 82 is provided at the front of the vehicle. It consists of a plate or platform 83 with longitudinal wires or rods 84 secured along the sides thereof and extending for a distance beyond the ends of the platform. The front ends of these rods slidably engage with holes 85 in the flange 79. The rear ends are bent as shown to provide upwardly extending branches 86 with inwardly extending short ends 87 which are under tension and biased to swing inwardly to engage with holes 88 in the sides of the frame members 17. When the foot rest is to be removed, the short ends 87 are drawn outwardly out of the holes which permits the rest to be lowered and the rods 84 to be pulled out of the holes 85, thus releasing the foot rest. When it is to be again attached, the reverse operation is performed.

The vehicle may also be provided with a tray 89 which is mounted on the bail 43 and may be detachably secured in any convenient manner as by means of a rolled edge fitting over the bail.

When the vehicle is folded or collapsed to its extreme lowered position, the post 40 which is formed of sheet metal lies against the upper surface of the housing 78 as shown in Figs. 5 and 6 and may be held in this position by means of a button 90 which is rotatably mounted in the arm and which may extend through a slot 91 in the housing and turned to locking position as indicated.

From this description, it will be seen that my improved vehicle may be adjusted for a large variety of purposes or uses. For instance, when it is to be used as a stroller, the parts are adjusted to the positions in Fig. 1 so that the child seated therein may rest its feet on the foot rest and the buggy or vehicle may be moved by means of the upwardly extending handle. This also serves as a shopping medium and packages may be placed on the plate 20 and steadied or held by the spring pressed plate 65. Then by releasing the pawl 72, the seat may be lowered to any desired degree and the pawl again permitted to engage with one of the notches 75 to hold the parts in such adjusted position.

When the vehicle is to be used as a walker, the handle and supporting bracket and foot rest may all be removed as shown in Fig. 7. When arranged in this manner, the child's legs may extend down to the ground and the device becomes self-propelling. Again the height of the seat may be readily adjusted for convenience of the child or for different sized children.

The ease and variety of adjustments make the vehicle particularly attractive to the children and useful for the various purposes indicated.

The vehicle may be completely folded or collapsed as shown in Fig. 2 without the removal of the handle 58 which may be swung forwardly as shown. When the parts are in this position, they are locked by the button 90 and the vehicle may be conveniently carried under the arm or by grasping any suitable portion of the same. While the vehicle may be made in any desired size, a commercial embodiment of the same is approximately 32 inches long, 10 inches high and 15 inches wide when folded which illustrates the small space required for receiving the same.

Having thus described my invention, what I claim is:

1. In a child's vehicle, the combination of a body, a supporting frame secured to the body and having bearings in the front end thereof, a tubular U-shaped frame member having its top horizontal portion mounted in said bearings and having two rearwardly extending branches, an axle secured to the ends of said branches, wheels mounted on said axle, a substantially T-shaped tubular frame member extending longitudinally of the center of the vehicle and having a transverse branch across the front of the vehicle, wheels mounted on said branch, a transverse rod secured to the upper end of the T-shaped member and pivotally mounted in the rear end of said frame, a ratchet secured to the horizontal portion of the U-shaped frame member extending downwardly through a slot in the upper portion of the T-shaped frame member adjacent to the transverse rod, said ratchet having an arcuate slot therein, a pin fixed in the T-shaped frame member and extending through said arcuate slot, a pawl pivotally mounted on the T-shaped frame member adjacent to the ratchet and adapted to coact with the ratchet, a spring tending to hold the pawl in engaging position, a thumbpiece on the pawl for actuating it to disengage it from the teeth in the pawl, the arrangement being such that the height of the body may be adjusted by releasing the pawl and lifting up the body whereby the upper ends of the frame members will swing upwardly within the range of the movement of the pin in said slot in the ratchet.

2. A folding vehicle of the character set forth consisting of a collapsible body, a transverse bearing on the lower part of the body adjacent to the center, a U-shaped frame member having its transverse upper portion mounted in said bearing and having rearwardly extending branches, an axle secured to said branches, wheels on said axle, a second frame member pivotally mounted to the lower portion of the body adjacent to the rear end thereof and extending forwardly, caster wheels mounted on said second frame member, a plate secured to the horizontal portion of the U-shaped frame member and extending downwardly through a slot in the second named frame member, said plate having arcuate teeth on its lower edge and having an arcuate slot therein, a pin fixed in the second named frame member and engaging with said arcuate slot and serving to limit the swinging movement of the frame members, a pawl mounted on the second named frame member adjacent to the toothed plate and means for actuating the pawl to cause it to engage with and be disengaged from the teeth, a handle supporting bracket detachably mounted to the body at the rear thereof, and a handle pivotally secured to said bracket.

References Cited in the file of this patent

UNITED STATES PATENTS

| | | |
|---|---|---|
| 679,750 | Hoffmann | Aug. 6, 1901 |
| 867,465 | Bacon | Oct. 1, 1907 |
| 1,081,221 | Durkin | Dec. 9, 1913 |
| 1,355,039 | Gibson | Oct. 5, 1920 |
| 2,301,640 | Peltier | Nov. 10, 1942 |
| 2,341,117 | Reinholz | Feb. 8, 1944 |
| 2,428,935 | Hansburg | Oct. 14, 1947 |
| 2,451,956 | Kemper | Oct. 19, 1948 |
| 2,464,226 | Gottfried | Mar. 15, 1949 |
| 2,471,004 | Moster | May 24, 1949 |